United States Patent
Snel (10) Patent No.: US 7,416,775 B2
(45) Date of Patent: Aug. 26, 2008

(54) WALL ELEMENT

(75) Inventor: Wilhelmus J. R. K. Snel, Ad Abbekerk (NL)

(73) Assignee: Unda Maris B.V., Abbekerk (NL)

( * ) Notice: Subject to any disclaimer, the term of this patent is extended or adjusted under 35 U.S.C. 154(b) by 0 days.

(21) Appl. No.: 10/923,174

(22) Filed: Aug. 20, 2004

(65) Prior Publication Data

US 2005/0074587 A1   Apr. 7, 2005

Related U.S. Application Data

(63) Continuation-in-part of application No. 10/617,430, filed on Jul. 11, 2003, now abandoned.

(51) Int. Cl.
*B32B 1/00* (2006.01)
*E04C 2/54* (2006.01)

(52) U.S. Cl. .......... 428/178; 428/72; 428/184; 428/188; 52/783.17; 52/783.18; 52/793.1

(58) Field of Classification Search .......... 428/178, 428/182, 184, 72, 188; 52/783.11, 783.17, 52/783.18, 783.19, 793.1
See application file for complete search history.

(56) References Cited

U.S. PATENT DOCUMENTS

| 787,065 | A | * | 4/1905 | White .......... 114/12 |
| 3,142,599 | A | * | 7/1964 | Chavannes .......... 156/210 |
| 3,204,667 | A | * | 9/1965 | Zahorski .......... 138/148 |
| 3,296,059 | A | | 1/1967 | Schwindt |
| 3,975,882 | A | * | 8/1976 | Walter .......... 52/571 |
| 4,025,996 | A | * | 5/1977 | Saveker .......... 428/594 |
| 4,052,828 | A | | 10/1977 | Mancini |
| 5,115,963 | A | * | 5/1992 | Yasui .......... 228/157 |
| 5,374,464 | A | | 12/1994 | Jacobsen et al. |

FOREIGN PATENT DOCUMENTS

| DE | 2 026 768 | 5/1971 |
| EP | 1180654 A1 | 2/2002 |
| NL | 1015909 C | 8/2000 |

OTHER PUBLICATIONS

U.S. Appl. No. 10/617,930, entitled "Wall Element at Least Substantially Made of Cellulose Material", filed Jul. 11, 2003.

* cited by examiner

*Primary Examiner*—Donald Loney
(74) *Attorney, Agent, or Firm*—Patterson & Sheridan L.L.P.

(57) ABSTRACT

A wall element, comprising two outer layers extending at least substantially parallel to each other, between which two or more intermediate layers are provided, characterized in that said intermediate layers extends between the outer layers in a zigzag fashion, wherein the intermediate layers are arranged in a nested fashion.

14 Claims, 8 Drawing Sheets

WALL ELEMENT

CROSS-REFERENCE TO RELATED APPLICATION

This application is a continuation-in-part of U.S. patent application Ser. No. 10/617,430, filed Jul. 11, 2003, now abandoned which application is herein incorporated by reference.

BACKGROUND OF THE INVENTION

1. Field of the Invention

The invention relates to a wall element, comprising two outer layers extending at least substantially parallel to each other, between which at least one intermediate layer is provided. The invention furthermore relates to a method for manufacturing said wall element.

2. Description of the Related Art

A prior art wall element is known from German patent no. 2 026 768 (Universal Papertech Corp.). Said patent discloses a building which is built up of many different constructional elements, such as a concrete floor, roof parts and sidewall parts made of a corrugated board intermediate layer, which is sandwiched between two flat outer layers, as well as clamps and corner elements. In practice it has become apparent that the constructional strength of the roof parts and the side wall parts is insufficient to give the building the required strength.

SUMMARY OF THE INVENTION

The object of the invention is to improve the wall element that is known from the aforesaid German patent publication, in the sense that a wall element is provided which exhibits an optimum constructional stiffness for functioning as a constructional element of a building, as a wall panel in a partition, etc. It is noted that the term wall element is understood to include an element for a wall, a floor, a ceiling, a roof, etc.

In order to accomplish that objective, a wall element of the kind referred to in the introduction is characterized in that said intermediate layer extends between the outer layers in a zigzag fashion, wherein the parts of the intermediate layer that extend from one outer layer to the other are at least substantially flat. Research has shown that the present zigzag shape results in an unexpectedly great constructional stiffness of the wall element, so that the wall element can be exposed to large forces without losing its structural integrity. The constructional strength is additionally increased if the part extending from one outer layer to the other extend at an angle of less than 90°, preferably between 30° and 75°, more preferably between 45° and 65°.

In one preferred embodiment of a wall element according to the invention, the parts extending from one outer layer to the other bound a flat portion of the intermediate layer, which abuts against an outer layer over a distance of 0-5 cm, preferably 0-3 cm, more preferably 0-2 cm. On the one hand the presence of the flat (intermediate) portion makes it possible to affix said portion to an outer layer, in order to increase the stiffness of the whole, but on the other hand, the distance over which the flat (intermediate) part is affixed to an outer layer in that case must remain within the indicated bounds, in order to prevent the whole from collapsing in an "accordion-like" fashion upon being loaded.

In another preferred embodiment of a wall element according to the invention, the parts extending from one outer layer to the other form a fold having a radius of less than 10 mm, preferably less than 5 mm, with each other. In other words, the magnitude of radius of the bend between parts extending from one part of the outer layer to the other is within the indicated bounds, which contributes to an optimum strength of the wall element.

In another preferred embodiment of a wall element according to the invention, said intermediate layer is at least substantially made of a material selected from the group of corrugated cardboard, massive cardboard and wood.

In another preferred embodiment of a wall element according to the invention, said outer layers are at least substantially made of a material selected from the group of corrugated cardboard, massive cardboard and wood. In particular, said intermediate layer and/or said outer layers is (are) at least substantially made of corrugated cardboard exhibiting a crimped surface profile, so that said intermediate layer and/or said outer layers can hardly be deformed, if at all, in any direction along their surface.

Preferably, said intermediate layer is formed of layers of paper/cardboard, wherein each layer is at least substantially made up of a corrugated sublayer and a flat sublayer affixed to one side thereof, wherein said paper/cardboard layers are interconnected via an adhesive, in particular a glue, which is present on the ridges of the corrugated sublayers. In a special embodiment, said intermediate layer can also be made up of a corrugated sublayer, wherein the two flat sublayers and the corrugated sublayer present therebetween are interconnected by means of an adhesive, in particular a glue, which is present on the ridges of said corrugated sublayer. In a preferred variant, also said outer layers are made up formed of layers of paper/cardboard, wherein each layer comprises a corrugated sublayer and a flat sublayer present on one side thereof, wherein an adhesive which is present on the ridges of the corrugated sublayers provides the interconnection of the paper/cardboard layers. In another preferred variant, said outer layers are made of wood. In yet another preferred variant, said outer layers are each made up of a gypsum board, which is built up of two paper/cardboard external layers, with an internal gypsum layer present therebetween. Said gypsum board can be connected to the intermediate layer of the present wall element either directly or with the interposition of a paper/cardboard layer, as will be explained yet hereinafter with reference to the drawing.

It is noted that the term paper is used for lighter sorts of paper, whilst the term cardboard is frequently used for heavier classes of paper. Within the framework of the invention no restriction as regards the sort of material is intended when the terms paper or cardboard and weight are used.

In another preferred embodiment of a wall element according to the invention, said wall element is arranged for accommodating piping, cables and the like and/or insulation material and/or stiffening material in the intermediate layer thereof. In itself the present wall element exhibits an ideal thermal insulation, on account of the relatively large air cavities in the zigzag intermediate layer, but said cavities can also be utilized, partially or entirely, for accommodating piping, cables and tubes or for insulation and/or stiffening material.

The invention furthermore relates to a method for manufacturing a wall element according to the invention, which method comprises the steps of:

pressing a strip of a starting material, which is at least substantially made of cellulose, against a mould having a zigzag surface for the purpose of pressing a zigzag shape in said strip of starting material so as to form the intermediate layer;

subsequently affixing the outer layers, which are at least substantially made of cellulose, to both sides of the intermediate layer.

Preferably, the intermediate layer is affixed to a carrier as a semi-finished product. This makes it possible to roll up the whole of intermediate layer and carrier into a roll and affix the outer layers to the intermediate layer at a later stage.

In one preferred embodiment of a method according to the invention, the strip of starting material is positioned relative to the mould by means of an underpressure between the strip of starting material and the mould.

The invention furthermore relates to a device for carrying out a method according to the invention, wherein a mould having a zigzag surface is provided.

In another embodiment, there are two separate intermediate layers which are each connected to an outer layer of the wall element. Typically each outer layer has a portion of one of the intermediate layers attached to it at a location where the intermediate layer runs parallel to the outer wall. The intermediate layer extends from the outer layer and forms an apex, or peak, which may attach to the opposite wall element. The apex, or peak, can be a point or a flat surface. The other wall element is a mirror image of the first wall element, but is arranged so that the intermediate layers interlock and are "nested," one within the other. Thus, each intermediate layer is attached to one outer layer initially and when the wall is constructed the other end of the intermediate layer, at the apex or peak, can be affixed to a valley of the other intermediate layer.

The invention furthermore relates to a method for manufacturing a wall element wherein, the method comprises the steps of: pressing a strip of a starting material against a mould having a zigzag surface for the purpose of pressing a zigzag shape in said strip of starting material so as to form intermediate layers; affixing each outer layer, to one side of one intermediate layer; and joining the two intermediate layers.

BRIEF DESCRIPTION OF THE DRAWINGS

The invention will now be explained in more detail by means of preferred variants of the invention as shown in a drawing, wherein.

DETAILED DESCRIPTION OF THE PREFERRED EMBODIMENT

Figure 1:
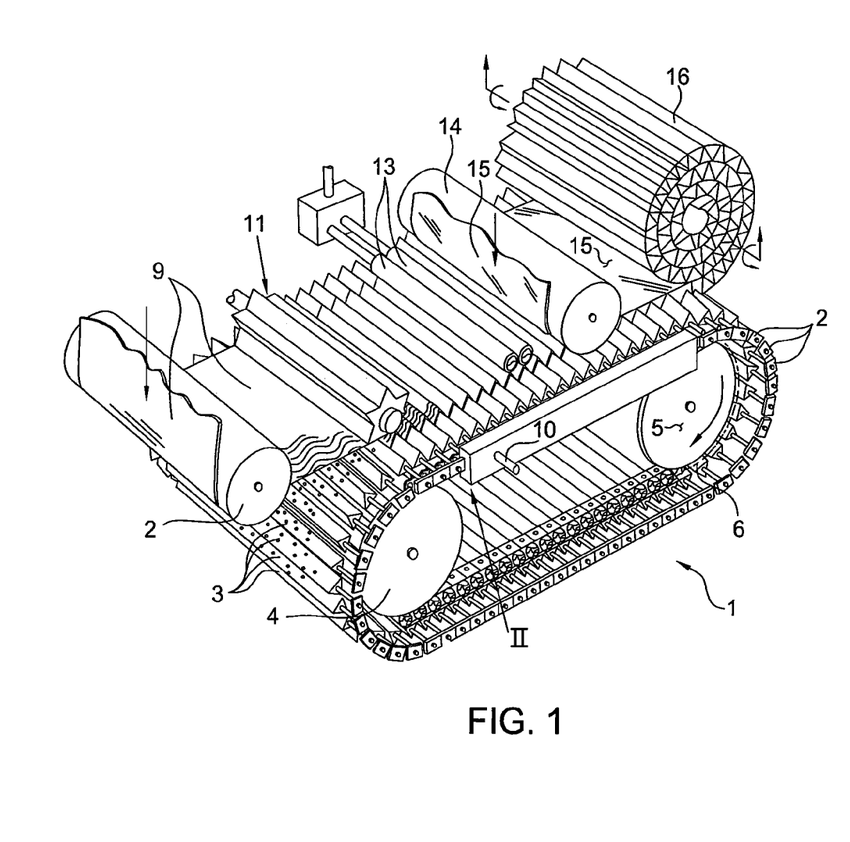
FIGS. 1 and 3 are schematic, perspective views of two embodiments of a device according to the invention from manufacturing a wall element according to the invention.
Figure 2:
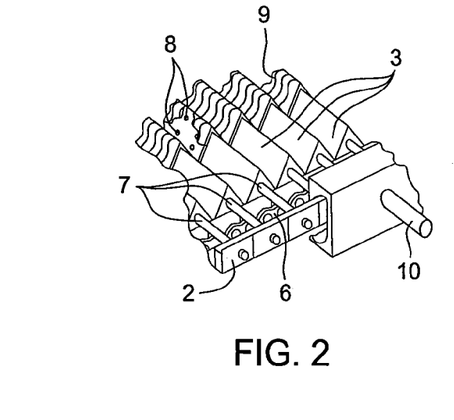
FIG. 2 shows a detail of FIG. 1.
Figure 3:
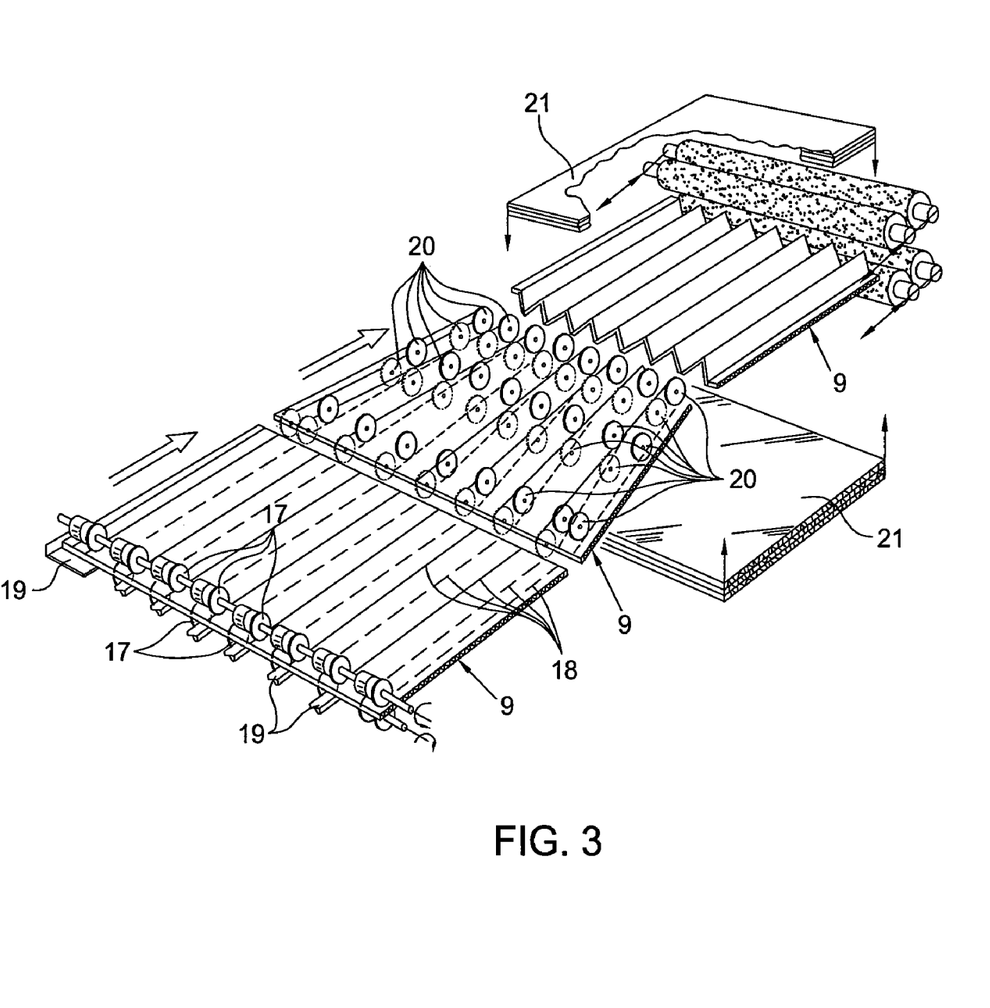

FIG. 1 shows a mould 1 according to the invention, comprising an endless, circulating belt 2, on which belt elements 3 of triangular cross-section are present Mould 1 furthermore comprises two driving rollers 4, 5 for driving a chain 6, which is connected to belt 2 via pins 7, and which consequently drives said belt. As is, shown in more detail in FIG. 2, pins 7 support the belt elements 3, whereby the latter are hollow and provided with perforations 8 on their outer surface. This makes it possible to position a strip of corrugated cardboard 9 from a supply roll (not shown) precisely with respect to belt 2, whereby an underpressure (in particular a vacuum) is generated in the hollow belt elements 3 via a pipe 10 so as to press/suck the strip of corrugated cardboard down onto belt 2, as it were. As is shown in FIG. 1, a rotary pressure element 11 of a star-shaped cross-section is used to press the strip of corrugated cardboard 9, which is moved past a hold-down roller 12, down on the belt 2 of the mould 1 with a suitable force and thus press a zigzag shape corresponding to the outer surface of the mould 1 into the strip of corrugated cardboard 9. The strip of corrugated cardboard 9 in its final zigzag shape forms and intermediate layer of a wall element according to the invention, as will be explained in more detail hereafter. Once the zigzag intermediate layer has been formed, corrugated cardboard outer, layers can directly be glued to both sides thereof, if desired. If the zigzag intermediate layer is stored as a semi-finished product, however, it is first glued, by means of glue rollers 13, to a paper carrier 15 from a storage roll (not shown) which is carried past a hold-down roller 14, after which the whole is wound into a roll 16. At a later stage, said zigzag intermediate layer can be detached from carrier 15 and corrugated cardboard outer layers can be glued to both sides thereof. In FIG. 2, those parts that correspond to parts shown in FIG. 1 are indicated by the same numerals. FIG. 3 schematically show the aforesaid strip of corrugated cardboard 9 of FIG. 1, in which folding or banding lines 18 are first formed, as a pre-operation, by means of a cutting die 17 in order to make it possible to give the strip of corrugated cardboard 9 its zigzag shape without using the mould 1. To this end, the strip of corrugated cardboard 9, once it has undergone the cutting operation, is moved along a guideway 9, which converges in the direction of movement of the strip of corrugated cardboard 9. Due to the natural weakness of the material of the corrugated cardboard, the folding lines 18 and the tapered or conical shape of the guideway 19, the zigzag shape is automatically obtained in the strip of corrugated cardboard 9, as it were. In order to realize a controlled guidance of the strip of corrugated cardboard 9, guide wheels 20 are used. After the formation of the zigzag intermediate layer, the aforesaid corrugated cardboard outer layers 21 are glued to both sides thereof.

Figure 4:
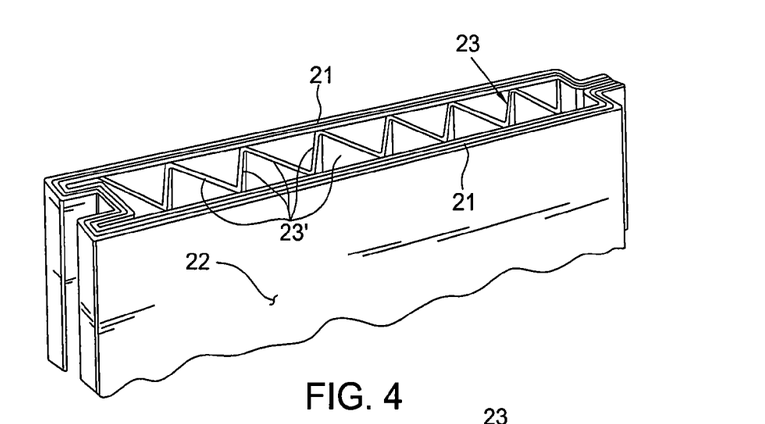
FIGS. 4-7 are schematic, perspective views of various embodiments of wall elements according to the invention.
Figure 5:
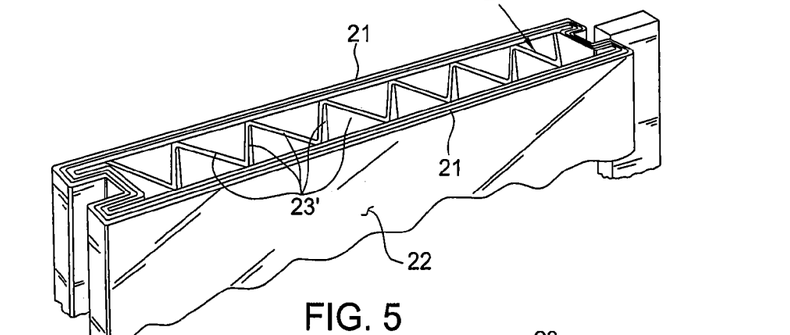
Figure 6:
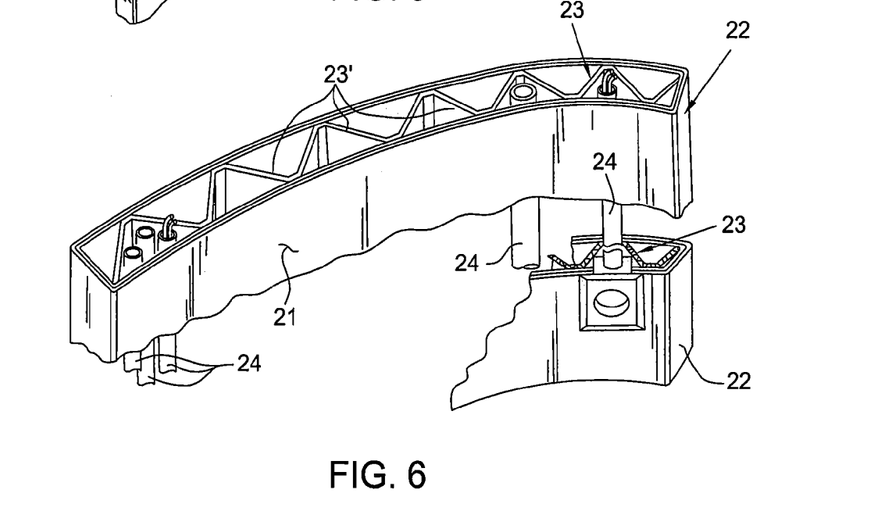

FIGS. 4, 5 and 6 are perspective views of various types of wall elements 22 according to the invention wherein each type comprises a zigzag intermediate layer 23 consisting of a corrugated sublayer, to both sides of which a flat sublayer is affixed. As FIGS. 4, 5 and 6 show, the parts 23' of the intermediate layer 23 that extend from one layer to the other are flat, so as to give the wall elements 22 an optimum strength. The outer layers 21 of the wall elements 22 of FIGS. 4, 5 and 6 are each built up of several layers of cardboard, each layer consisting of a corrugated sublayer, and a flat layer glued to one side thereof by means of a glue applied to the ridges of the corrugated sublayer. Wall element 22 pf FIG. 6 is curved, with pipes 24 being passed through the intermediate layer 23 thereof, whilst the outer layers 21, just like the outer layers of wall element 22 of FIG. 5, are in fact formed by using a winding process wherein one outer layer 21 is wound around the intermediate layer 23 several times.

Figure 7:
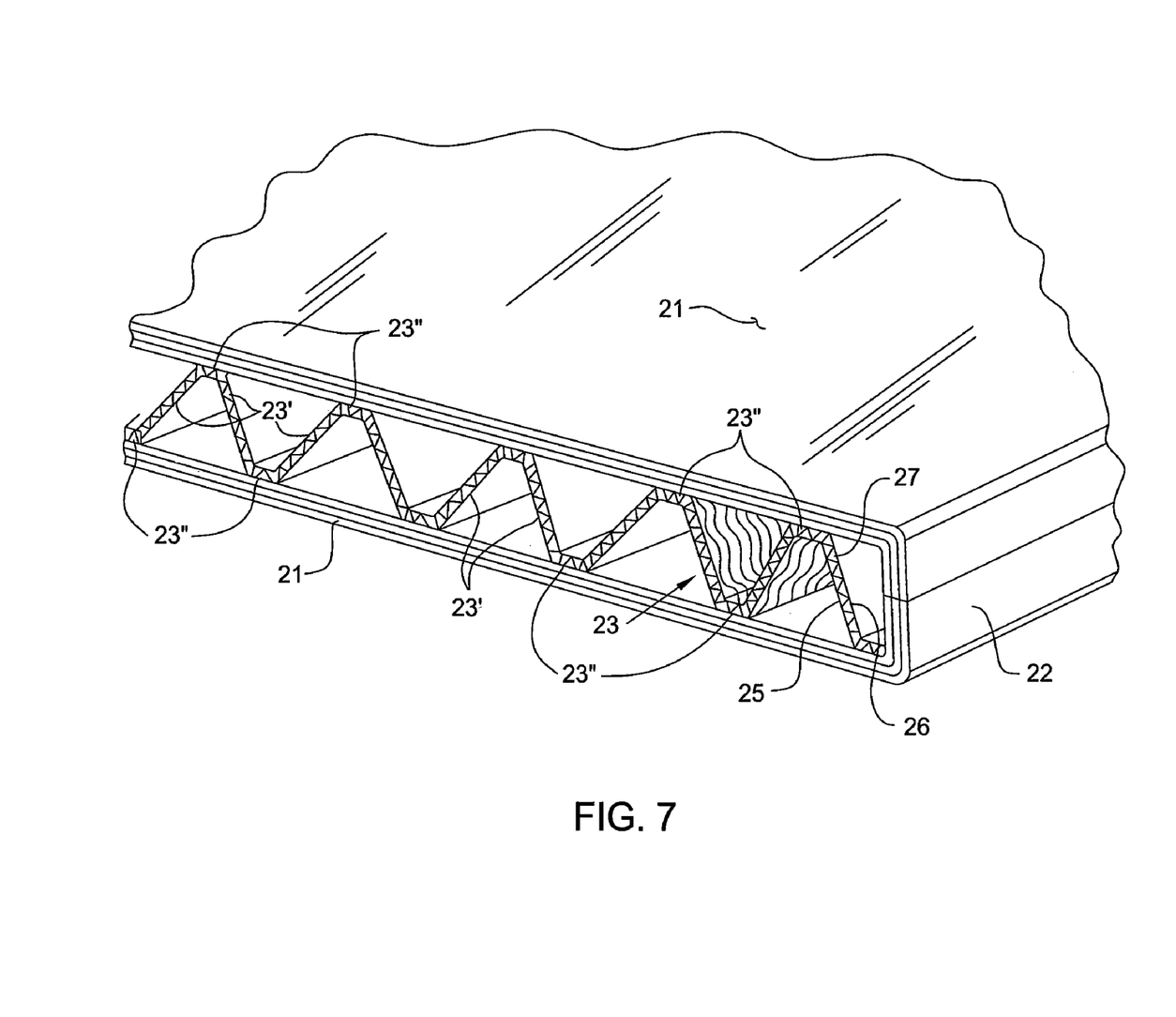

FIG. 7 is a perspective view of another variant of a wall element 22 according to the invention, which clearly shows that the intermediate layer 23 is built up of a corrugated sublayer 27 which is sandwiched between flat sublayers 25, 26, whilst the outer layers 21 comprise three glued-together layers of corrugated cardboard, which are each built up of a corrugated sublayer and a flat sublayer affixed to one side thereof, wherein glue is present on the corrugations of the corrugated sublayer. Depending on the required strength, it is also possible to form the intermediate layer 23 and/or the outer layers 21 of more layers than in the illustrated example. The parts 23' of the intermediate layer 23 that extend from on outer layer 21 to the other bound a flat portion 23" of the intermediate layer 23, which flat portion 23" abuts against the respective outer layer 21 over a distance of 2 cm, in this embodiment, and which is glued together therewith.

Figure 8:
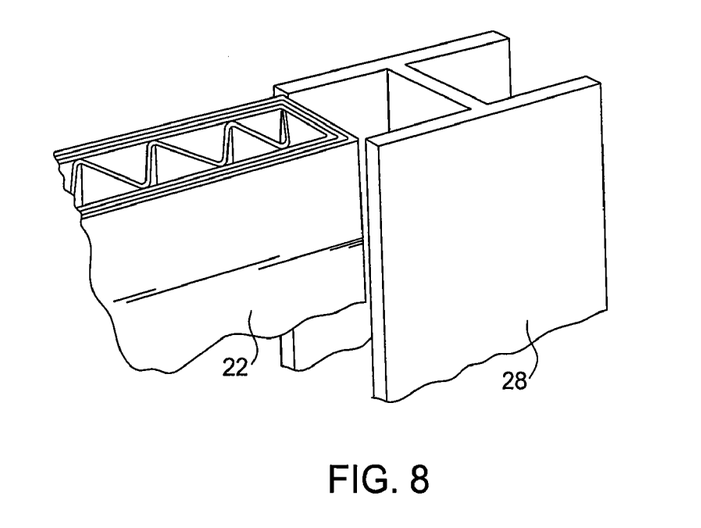
FIGS. 8 and 9 relate to two ways of connecting a wall element according to the invention to a structural section.
Figure 9:
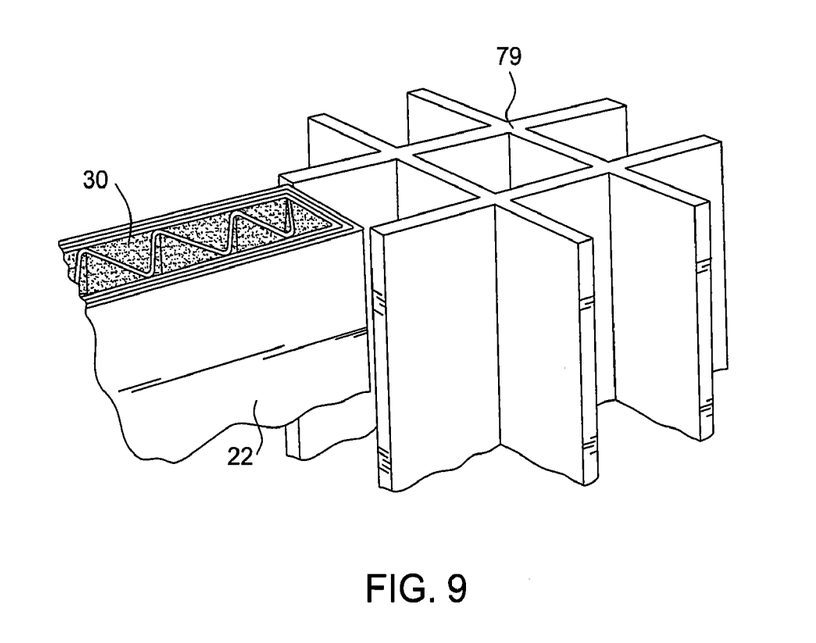

A wall element 22 according to the invention can readily be used in a building structure, wherein the wall element 22 is inserted into a metal H-section 28 (FIG. 8), for example, or into a metal section 29 having a more complex shape (FIG. 9). The wall element 22 of FIG. 9 is filled with the insulation material 30. It is also possible to use a strengthening material instead of such insulation material.

Figures 10, 11:
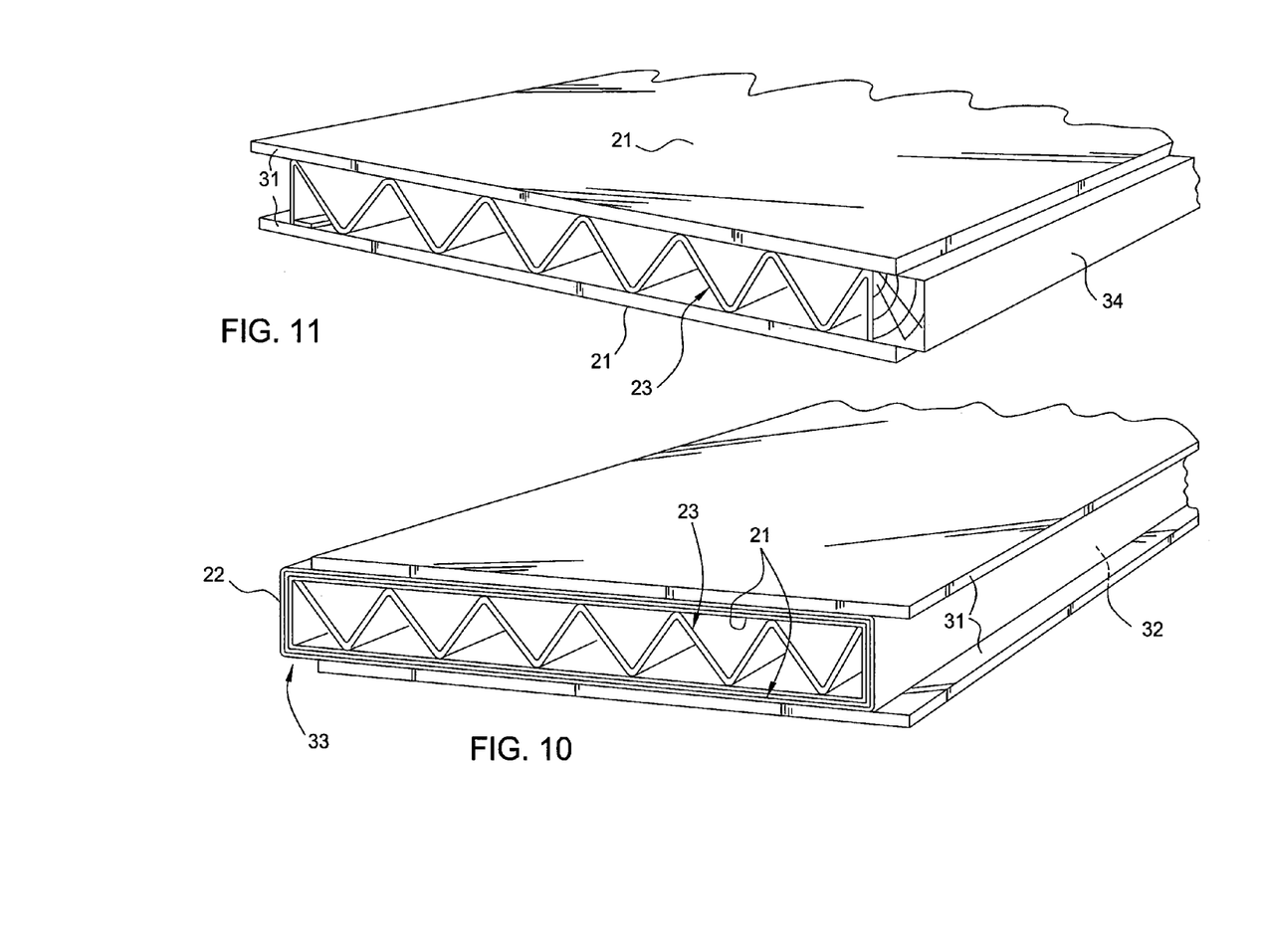
FIGS. 10 and 11 show to further embodiments of a wall element according to the invention.

FIG. 10 relates to a preferred variant according to the invention, wherein a wall element 22, for example the wall element that is shown in FIG. 4, 5, 6 or 7, comprises a gypsum plate 31 on both sides, which is affixed thereto. Since the gypsum plates 31 are offset with respect to wall element 22 as it were, the whole, which functions as a constructional element, comprises a through channel 32 at one end side and a projecting part 33 of wall element 22 at the other end side, so that such constructional elements can be easily interconnected by inserting the projecting part 33 of on constructional element into the through channel 32 of the other constructional element, FIG. 11 corresponds to FIG. 10, with parts corresponding to parts shown in FIG. 10 being indicated by the same numerals, but wherein the intermediate layer 23 is directly connected to the gypsum plates 31 on both sides, that is, without the additional outer layers of FIG. 10 being used. In that case, the paper/cardboard outer layers of the gypsum plates 31 that face towards the intermediate layer function as the "outer layer" 21 for the intermediate layer 23", as is shown in FIG. 11. Instead of forming the wall element 22 with a projecting part on one side (FIG. 10), it is also possible, of course, to use a separate beam 34 (FIG. 11), for example made of wood, which projects from between the gypsum plates 31.

Figure 12:
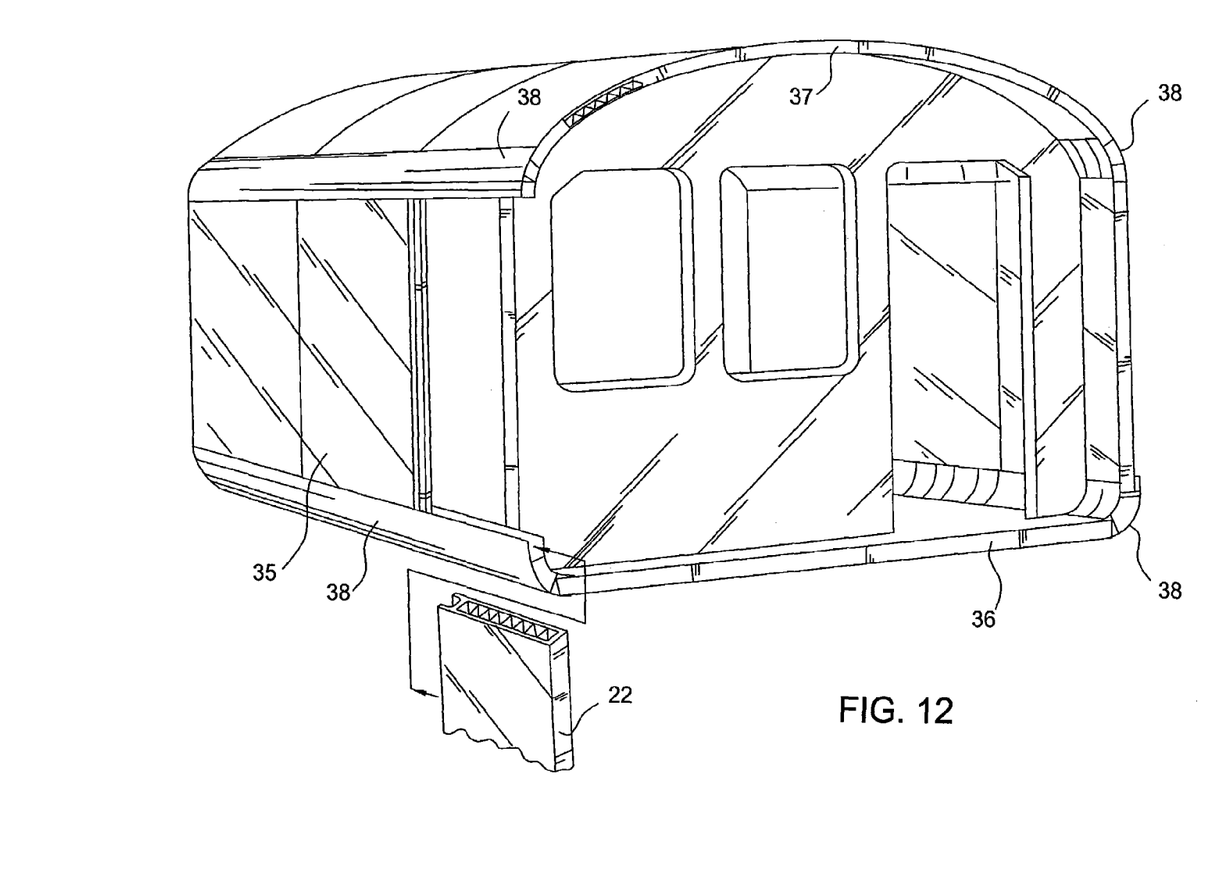
FIG. 12 is a schematic, perspective view of a building which is built up of wall elements according to the invention.

FIG. 12 is a perspective view of a building, wherein wall elements 22 form the eventual walls 35, a floor 36 and a (curved) ceiling 37. Use is made of sections 28 thereby, which sections are so configured that the wall elements 22 can readily be received therein, for example by sliding.

Figure 13:
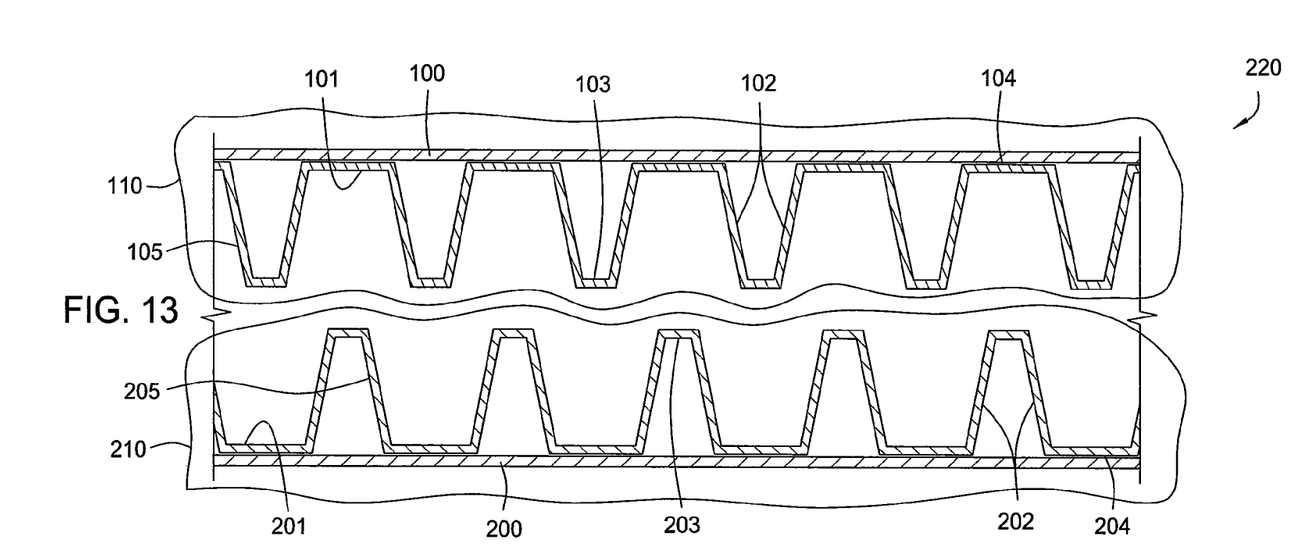
FIG. 13 is a schematic, perspective end view of another embodiment of the invention.

FIG. 13 is an exploded end view of another embodiment of a wall element 220. In this embodiment wall element 220 consists of two constructional parts 110, 210. Each one of the two constructional parts 110, 210 consist of an outer layer 100, 200 and an intermediate layer 105, 205. The intermediate layers 105, 205 and the outer layer can be made of various materials (for example; card board, wood, cellulose material, gypsum, sheetrock, metal, plastic, fiberglass, etc.). The outer layer 100, 200 is substantially flat or planar. The intermediate layers 105, 205 are initially planar, but are shaped into a zigzag fashion shown in the figure. While the zigzag fashion is illustrated as having defined corners it should be appreciated that the layers could be formed into curved members and configured as a sinusoidal wave. In the embodiment of FIG. 13, the zigzag of the intermediate layers 105, 205 forms of valleys 101, 201 between peaks, 103, 203 which are connected by side walls, 102, 202. The bottom surface 104, 204 of each valley 101, 201 is affixed to an outer layer 100, 200, to form the constructional part 110, 210, by any means (for example glue, adhesives, nails, screws, etc.). The valleys 101, 201 can be of any length so long as the peaks 103, 203 fit between the side walls, 102, 202 of the other constructional part 110, 210. Each constructional part 110, 210 is a mirror image of the other constructional part 110, 210.

Figure 14:
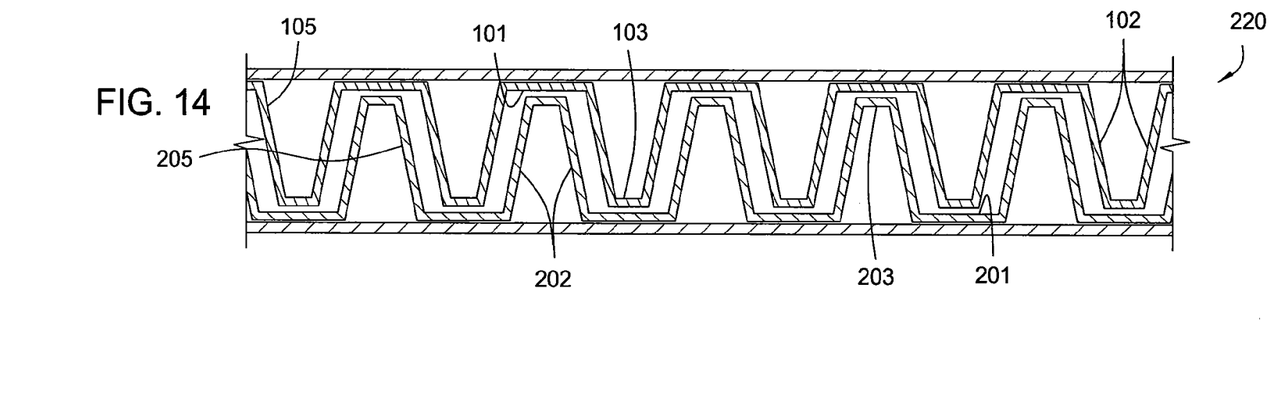
FIG. 14 is an exploded view of FIG. 13.

FIG. 14 is an end view of the assembled wall element 220 from FIG. 13. The two construction parts 110, 210, of FIG. 13, are joined together so that the peaks 103, 203 of one intermediate layer 105, 205 are affixed to the valleys 101, 201 of the other intermediate layer. The peaks 103, 203 can be affixed to the valley 101, 201 by any means (for example glue, adhesives, nails, screws, etc.). Although FIG. 14 shows the peaks 103, 203 being fixed to the valley 101, 201 it should be appreciated that the intermediate layers 105, 205 could be affixed at the side walls, 102, 202. As assembled, the peaks 103, 203 nest into the valleys 101, 201 of the opposite intermediate layer 105, 205, and the outer layers 100, 200 enclose both intermediate layers 105, 205.

The invention claimed is:

1. A wall element, comprising:
   two outer layers extending at least substantially parallel to each other to form at least a portion of a wall; and
   two or more intermediate layers disposed between the outer layers and wherein each intermediate layer extends substantially the length of the portion of the wail;
   wherein each of the two or more intermediate layers extend between the outer layers in a zigzag fashion, wherein the zigzag fashion includes a plurality of plateaued peaks and valleys at each end of a plurality of side walls formed into each intermediate layer, the plurality of plateaued peaks and valleys configured to be substantially parallel with the two outer layers, the intermediate layers assembled in a manner whereby a flat inner surface of each of the plateaued peaks of a first intermediate layer is configured to directly couple to a flat inner surface of the plateaued valleys of a second intermediate layer and a first one of the two or more intermediate layers is attached to a first outer layer and a second one of the two or more intermediate layers is attached to a second outer layer and a void is formed between the intermediate layers, wherein the void extends along the length of the portion of the wall, and the intermediate layers are nested together.

2. The wall element of claim 1, wherein the void is between the side wall of a first intermediate layer and a side wall of a second intermediate layer.

3. The wall element of claim 1, further comprising one or more connector portions formed at one or more edges of the wall element, the connector portions configured to couple two or more wall elements together to form a structure.

4. The wall element of claim 3, wherein the connectors of a first end and a second end are both male.

5. The wall element of claim 3, wherein the connectors of a first end and a second end are both female.

6. The wall element of claim 3, comprising:
   a first end with a male connector; and
   a second end with a female receiving connector.

7. The wall element of claim 6, wherein the two outer layers are configured to form the connector of the first end and the second end.

8. The wall element of claim 1, wherein a conduit is disposed between the two or more intermediate layers.

9. The wall element of claim 8, wherein the conduit contains wires.

10. The wall assembly of claim 1, further comprising an insulating material located in the void.

11. The wall assembly of claim 1, wherein a flat outer surface of the plateaued valleys of each of the two or more intermediate layers is attached directly to a flat inner surface of the corresponding outer layer.

12. The wall assembly of claim 2, wherein the void is unobstructed between the intermediate layers.

13. The wall element of claim 1, wherein the flat inner surface of the plateaued peaks of the first intermediate layer are configured to increase the contact surface are between the first intermediate layer and the second intermediate layer thereby increasing the strength of a connection between the intermediate layers.

14. The wall element of claim 13, wherein an adhesive is applied to the flat inner surface of the plateaued peaks and the flat inner surface of the plateaued valleys.

* * * * *

UNITED STATES PATENT AND TRADEMARK OFFICE
CERTIFICATE OF CORRECTION

PATENT NO. : 7,416,775 B2  Page 1 of 1
APPLICATION NO. : 10/923174
DATED : August 26, 2008
INVENTOR(S) : Snel It is certified that error appears in the above-identified patent and that said Letters Patent is hereby corrected as shown below:

In the Claims:

Column 6, Claim 1, Line 8, please delete "wail" and insert --wall-- therefor.

Signed and Sealed this

Thirtieth Day of December, 2008

JON W. DUDAS
*Director of the United States Patent and Trademark Office*